US012281763B1

(12) United States Patent
Hwang

(10) Patent No.: US 12,281,763 B1
(45) Date of Patent: Apr. 22, 2025

(54) WATERPROOF ELECTRONIC CANDLE LAMP

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

(*) Notice: Subject to any disclaimer, the term of this patent is extended or adjusted under 35 U.S.C. 154(b) by 0 days.

(21) Appl. No.: 18/809,572

(22) Filed: Aug. 20, 2024

(51) Int. Cl.
*F21S 10/04* (2006.01)
*F21S 9/02* (2006.01)
*F21V 17/16* (2006.01)
*F21V 31/00* (2006.01)
*F21Y 115/10* (2016.01)

(52) U.S. Cl.
CPC ............... *F21S 10/046* (2013.01); *F21S 9/02* (2013.01); *F21V 31/005* (2013.01); *F21V 17/164* (2013.01); *F21Y 2115/10* (2016.08)

(58) Field of Classification Search
CPC .......... F21S 10/046; F21S 9/02; F21V 31/005
USPC .......................................................... 362/157
See application file for complete search history.

(56) References Cited

U.S. PATENT DOCUMENTS 6,817,730 B2 * 11/2004 Sharrah ................. F21V 14/045 362/205
7,311,417 B1 * 12/2007 Lemke .................. F21V 29/767 362/208
9,746,170 B1 * 8/2017 Armer ...................... F21V 29/58
10,069,318 B2 * 9/2018 Waters ..................... F21L 4/005
11,287,121 B1 * 3/2022 Sharrah ...................... F21S 9/02
2005/0036307 A1 * 2/2005 Wang .................. F21V 23/0421 362/157
2005/0088842 A1 * 4/2005 Mah ........................ F21L 13/06 362/157
2015/0176785 A1 * 6/2015 Liu ......................... F21V 31/00 362/392
2018/0111654 A1 * 4/2018 Emerson .................... B62J 6/03
2020/0300453 A1 * 9/2020 Buhl ....................... F21L 4/005

* cited by examiner

*Primary Examiner* — Bryon T Gyllstrom
(74) *Attorney, Agent, or Firm* — BACON & THOMAS, PLLC

(57) ABSTRACT

A waterproof electronic candle lamp includes a positioning cover installed in a hollow column, a swinging part swingingly installed on the positioning cover to simulate a swaying flame, an integrated circuit board (PCBA) for driving the swinging part to swing and projecting light onto the swinging part, and a waterproof hood which is a cover installed above the integrated circuit board, and a waterproof battery compartment with a battery installed inside, where the waterproof hood and the waterproof battery compartment can prevent rain from damaging the electronic components in the electronic candle lamp.

8 Claims, 8 Drawing Sheets

WATERPROOF ELECTRONIC CANDLE LAMP

TECHNICAL FIELD OF THE DISCLOSURE

The present disclosure relates to a simulated candle lamp, in particular a waterproof electronic candle lamp with a waterproof structure that can be used outdoors.

DESCRIPTION OF RELATED ART

A traditional candle involves a certain fire risk in use. Therefore, a simulated electronic candle lamp has been introduced to the market to ensure the safety of using candles. The structure of electronic candle lamps of this sort usually comes with a through hole formed at the top of a candle-shaped casing, a simulated flame sheet installed above the through hole, and an LED, an electronic driving device and a power supply module which are installed in the casing. The simulated flame sheet is driven by the electronic driving device to shake sideway above the through hole, and let the LED emit light through the through hole to brighten up the simulated flame sheet, so as to provide a visual sense of the swaying candle flame of the simulated candle.

However, its disadvantage lies in that these electronic candle lamps are generally not designed with waterproof structures, so that when the electronic candle lamps are used outdoors, rainwater will flow into the casing from the through hole at the top, causing damage to the internal LED, electronic driving device and power supply module. Therefore, how to make the electronic candle lamp be a waterproof structure without affecting the swinging of the simulated flame sheet, so that the electronic candle can be used outdoors, is what the present disclosure intends to improve.

SUMMARY OF THE DISCLOSURE

Specifically, the present invention is directed to a waterproof electronic candle lamp, which includes:

a hollow column, with a top surface, a bottom end, and an accommodation space formed between the top surface and the bottom end, wherein a through hole is formed on the top surface to communicate the accommodation space;

a positioning cover, installed under the top surface, integrally including a ring frame around the inner periphery of the through hole, and a side casing positioned at a side edge of the ring frame, wherein the ring frame is swingably provided with a swinging member, and the swinging member has a simulated flame sheet protruding from the top surface of the hollow column and a magnetic element installed below the simulated flame sheet;

an integrated circuit board (PCBA), including a substrate positioned under the positioning cover and provided with an electromagnetic element at a position below the magnetic element, and an LED projecting light towards the simulated flame sheet and protruding upwards relative to the side casing, and the electromagnetic element generating a magnetic force in a non-contact manner to drive the magnetic element of the swinging member to swing and move, and then the simulated flame sheet producing a swaying bright light of a simulated flame;

a waterproof hood, positioned below the positioning cover, and arranged from top to bottom above the integrated circuit board including a cover plate, and a spacing defined between the cover plate and the swinging member for providing a swinging space for the swinging member, the hood being integrally formed into a convex shape and provided with a translucent part which is located at the periphery of the LED to allow the light of the LED to pass through the translucent part, and the outer periphery of the cover plate extending downwards to form an outer wall plate that surrounds the periphery of the integrated circuit board, and a bottom plate being arranged below the outer wall plate to shade the bottom of the integrated circuit board, the integrated circuit board being sealed between the cover plate and the bottom plate, and the bottom plate being provided with a first pipe that extends downward; and a waterproof battery compartment, arranged in the accommodating space between the waterproof hood and the bottom end of the hollow column, and including a battery, and a waterproof cover positioned above the battery, extending upward and having a second pipe directly or indirectly connected with the first pipe, and the first and second pipes being provided with a plurality of power lines electrically connected between the battery and the integrated circuit board.

Compared with the prior art, the present disclosure discloses the waterproof hood arranged outside the integrated circuit board for installing the battery in the waterproof battery compartment, so as to prevent damages of the integrated circuit board, the battery and other electronic components caused by the rainwater that penetrates into the accommodation space, and the cover plate of the waterproof hood keeps an appropriate distance from the electromagnetic element and the magnetic element respectively, which will not affect the induction between the electromagnetic element and the magnetic element, nor will it affect the swinging of the simulated flame sheet, so as to meet the requirement of using the electronic candle lamp outdoors.

The technical characteristics of the present disclosure will become apparent with the detailed description of preferred embodiments accompanied with the illustration of related drawings as follows.

DETAILED DESCRIPTION OF THE DISCLOSURE

Figure 1:
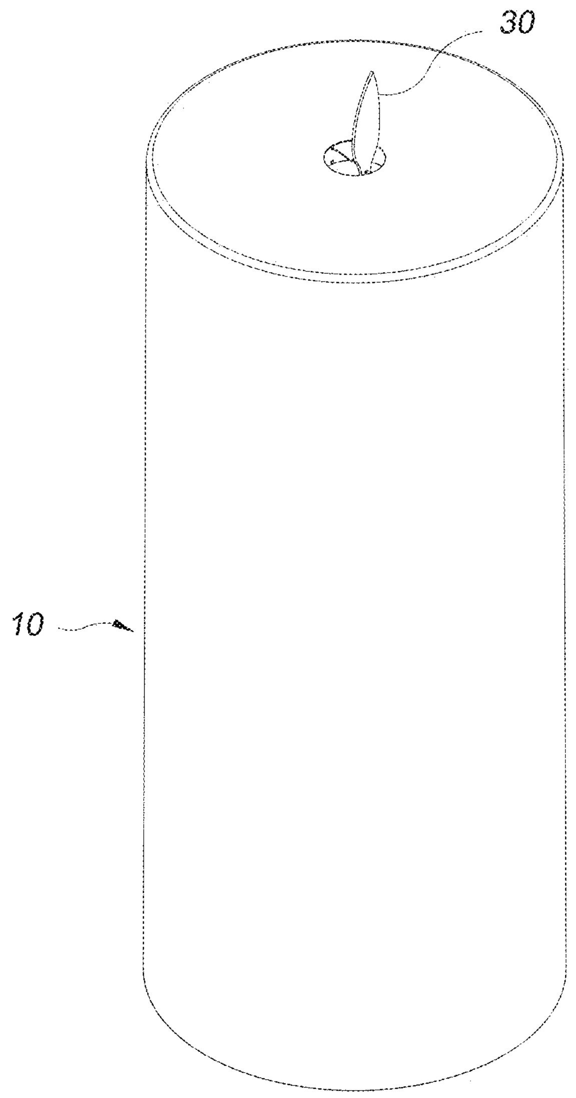
FIG. 1 is a perspective view of the present disclosure.
Figure 2:
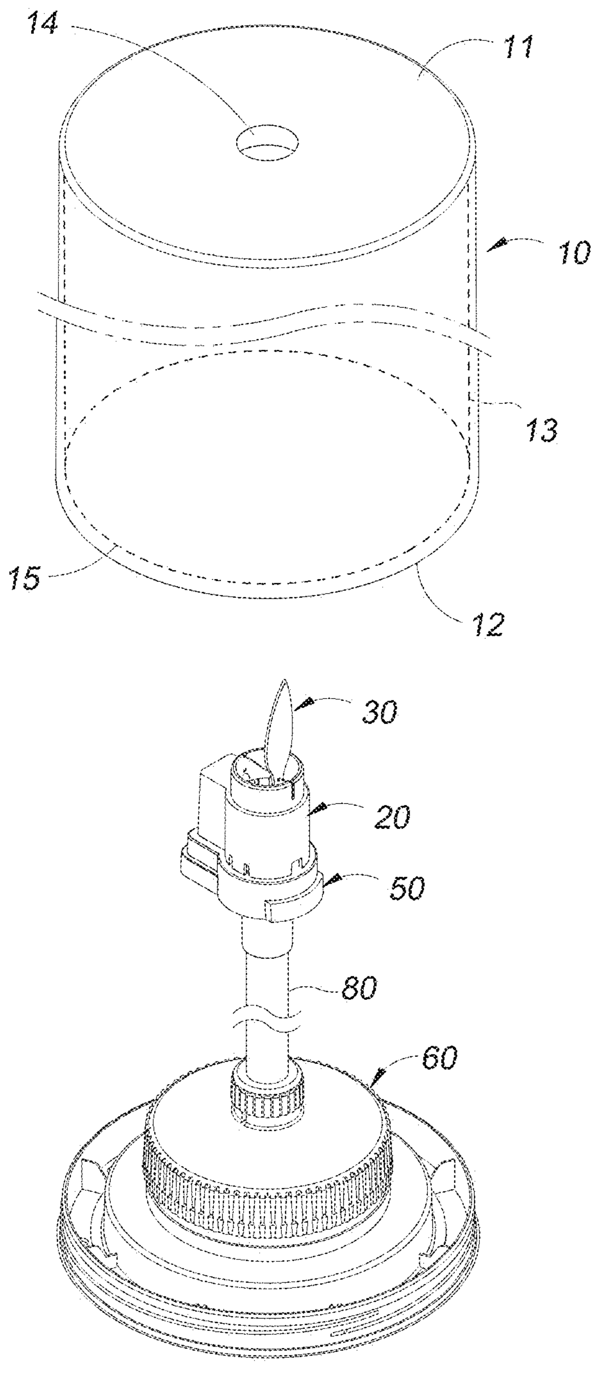
FIG. 2 is an exploded view of a part of the present disclosure.
Figure 3:
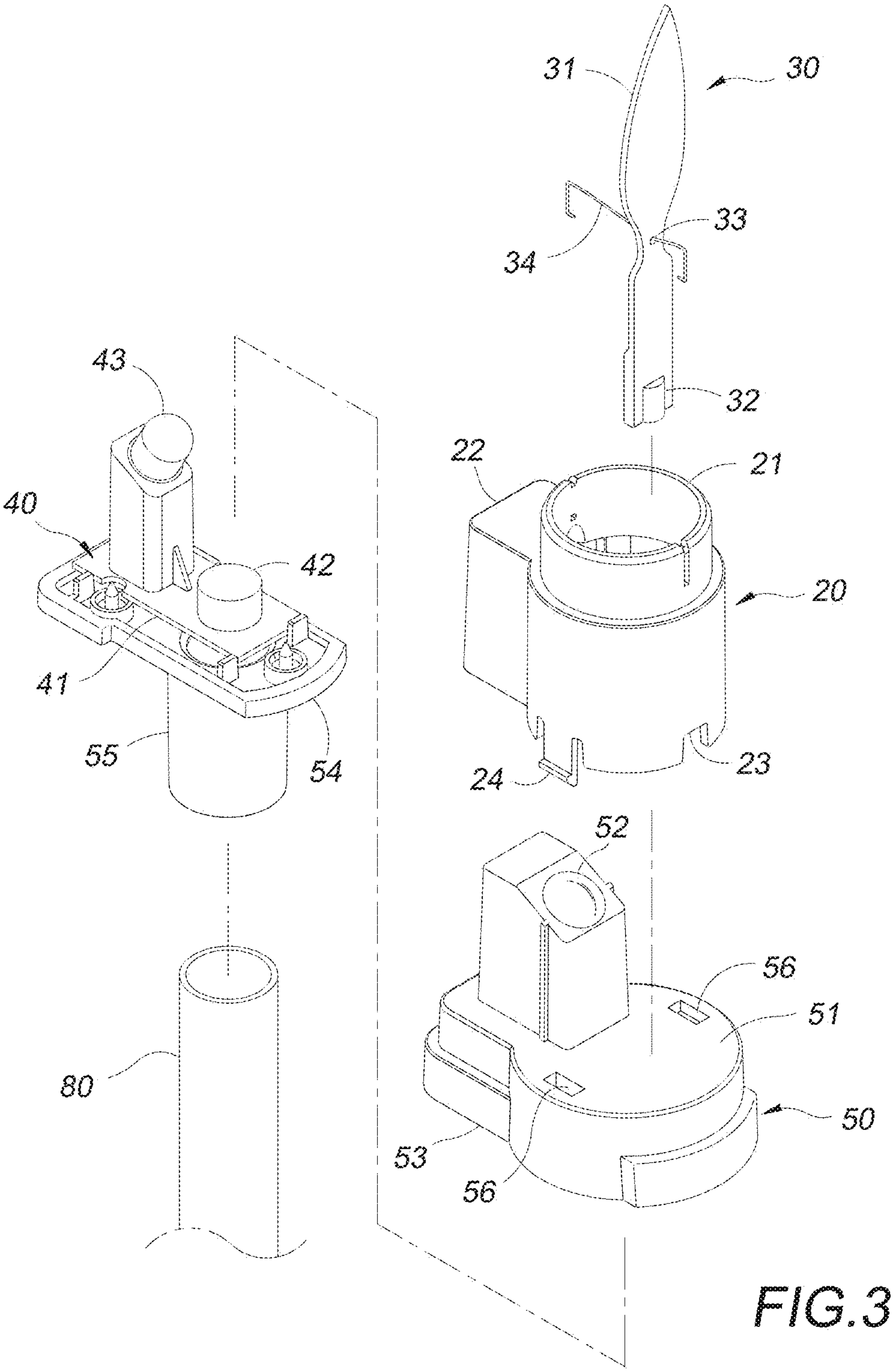
FIG. 3 is an exploded view showing a positioning cover, a swinging member, an integrated circuit board, a waterproof hood, and a waterproof sleeve of the present disclosure.

With reference to FIGS. 1 to 3 for a waterproof electronic candle lamp of the present disclosure, the waterproof electronic candle lamp includes: a hollow column 10, and a positioning cover 20, a swinging member 30, an integrated circuit board (PCBA) 40, a waterproof hood 50, and a waterproof battery compartment 60, which are respectively installed in the hollow column 10.

The hollow column 10 has an accommodation space 13 formed between the a top surface 11 and a bottom end 12 for accommodating the positioning cover 20, the integrated circuit board 40, the waterproof hood 50, and the waterproof battery compartment 60, and the top surface 11 is provided with a through hole 14 to communicate the accommodation space 13.

The positioning cover 20 integrally comprises a ring frame 21 and a side casing 22 positioned at a side edge of the ring frame 21, wherein the swinging member 30 is swingably installed to the ring frame 21.

The swinging member 30 comprises a simulated flame sheet 31, a magnetic element 32 positioned below the simulated flame sheet 31, a through hole 33 arranged between the simulated flame sheet 31 and the magnetic element 32, and a steel wire 34 permeated and arranged in the through hole 33.

Figure 4:
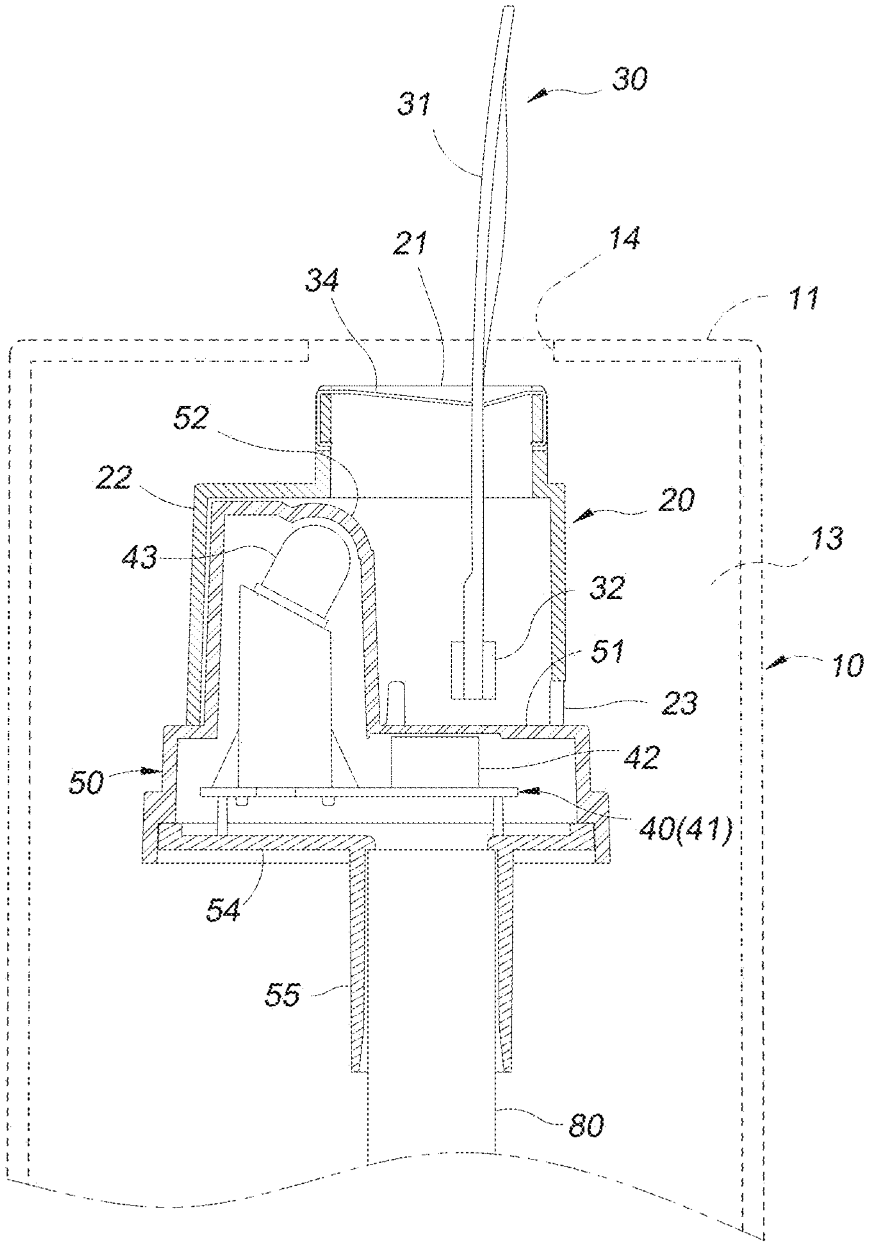
FIG. 4 is a schematic view of the assembled structure of FIG. 3.

As shown in FIGS. 3 and 4, when assembled, the positioning cover 20 is arranged below the top surface 11 of the hollow column 10, and the ring frame 21 is arranged at the inner periphery of the through hole 14, and the steel wire 34 of the swinging member 30 is spanned across the ring frame 21, so that the simulated flame sheet 31 can protrude upwards from the top surface 11 of the hollow column 10, and the simulated flame sheet 31 can be swung with the through hole 33 and steel wire 34 as the fulcrum with respect to the ring frame 21.

The integrated circuit board 40 comprises a substrate 41 arranged below the positioning cover 20, the substrate 41 is provided with an electromagnetic element 42 at a position below the magnetic element 32, an LED 43 is protruding from the position relative to the side casing 22 and the LED 43 can project light towards the simulated flame sheet 31, and the electromagnetic element 42 can generate a magnetic force in a non-contact manner to drive the magnetic element 32 to swing and move. In addition, the bright light projected by LED 43 on the simulated flame sheet 31 produces the visual effect of a simulated swaying flame.

Figure 5:
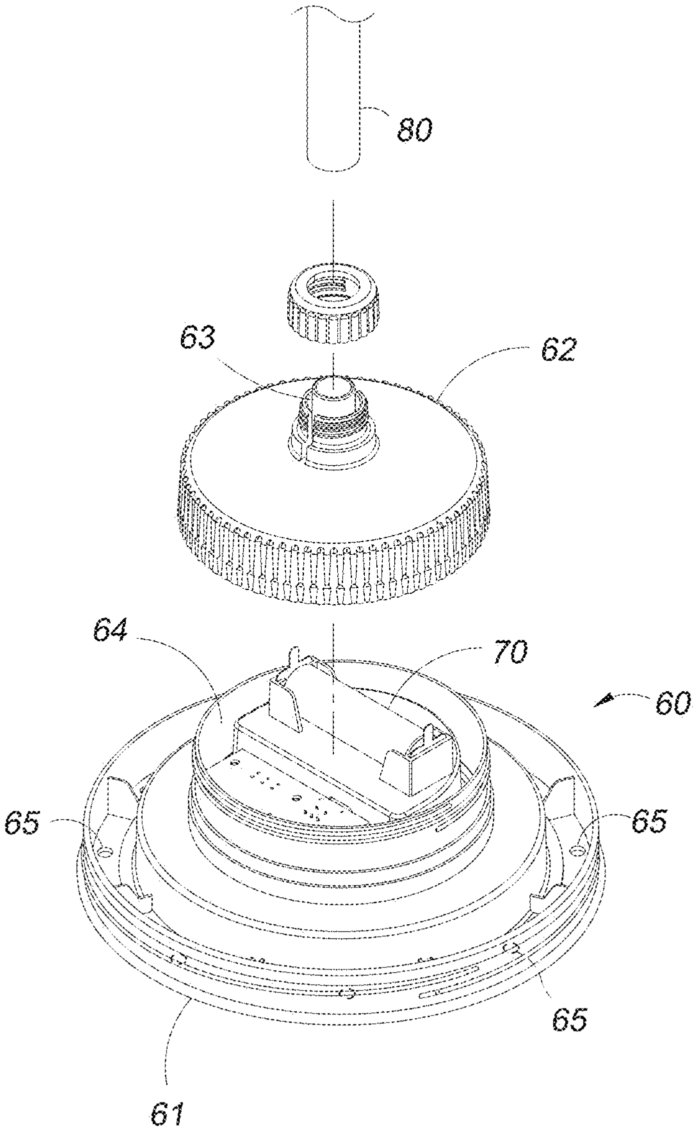
FIG. 5 is an exploded view of the waterproof battery compartment and waterproof sleeve of the present disclosure.

As shown in FIGS. 3~5, the waterproof hood 50 and the waterproof battery compartment 60 can provide a waterproof function, so that the waterproof electronic candle lamp of the present disclosure is suitable for outdoor uses. The waterproof hood 50 is positioned below the positioning cover 20, and includes a cover plate 51 that is arranged above the integrated circuit board 40 from top to bottom, and there is a spacing between the cover plate 51 and the swinging member 30, so that the swinging member 30 has a swinging space. The cover plate 51 is convex with a translucent part 52 relative to the LED 43 integrally formed, the translucent part 52 is shielded at the periphery of the LED 43, and the light rays of the LED 43 can pass through the translucent part 52 and then project light towards the simulated flame sheet 31.

The outer periphery of the cover plate 51 extends downward to form an outer wall plate 53 surrounding the periphery of the integrated circuit board 40, a bottom plate 54 is arranged below the outer wall plate 53 to shade the bottom of the integrated circuit board 40, the integrated circuit board 40 is sealed between the cover plate 51 and the bottom plate 54, and the bottom plate 54 extends downwards with a first pipe 55.

Figure 6:
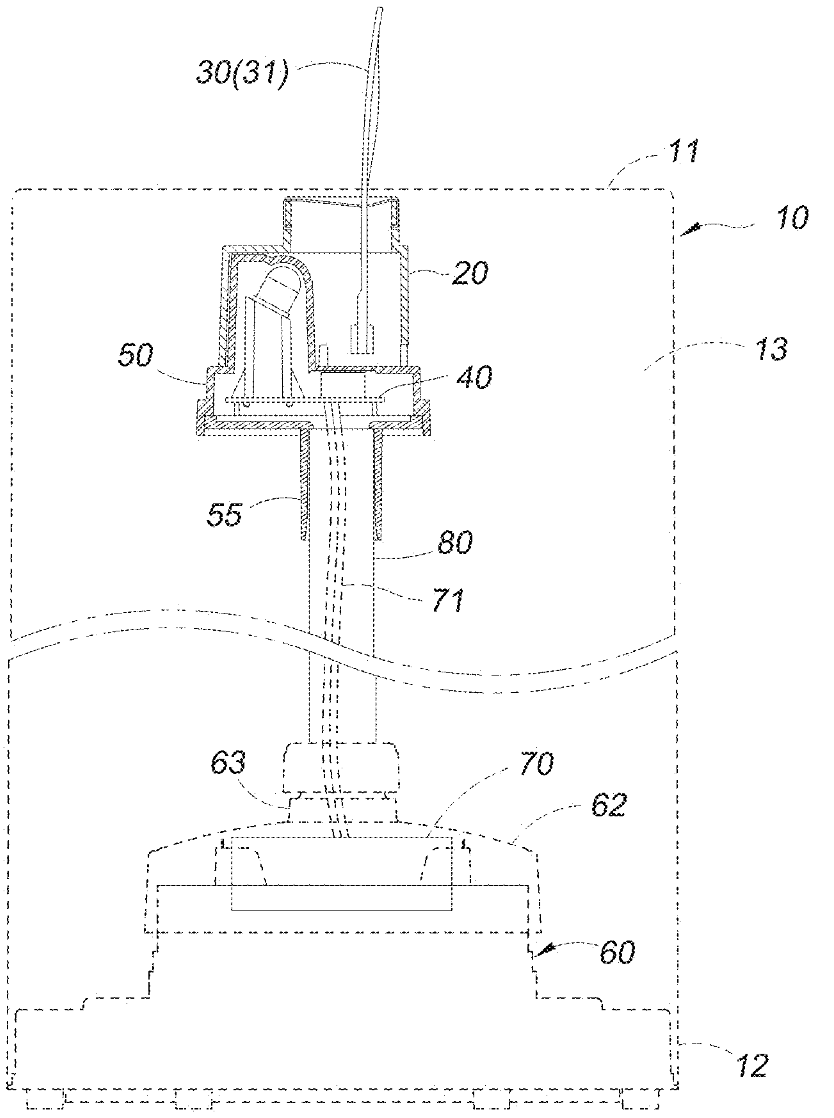
FIG. 6 is a schematic view of the assembled structure of the present disclosure.

As shown in FIGS. 5 and 6, the waterproof battery compartment 60 is arranged in the accommodating space 13 between the waterproof hood 50 and the bottom end 12 of the hollow column 10, the waterproof battery compartment 60 includes a base 61, a battery 70 arranged on the base 61, and a waterproof cover 62 covering the battery 70, and a second pipe 63 directly or indirectly engaged with the first pipe 55 on the waterproof cover 62, extending upwards on the waterproof cover 62, and the first pipe 55 and the second pipe 63 are provided with a plurality of power lines 71 which are electrically connected between the battery 70 and the integrated circuit board 40, so that the battery 70 can supply power to the integrated circuit board 40 through the power lines 71.

As shown in FIGS. 4 and 5, through the above-mentioned structure, the positioning cover 20, the swinging member 30, the integrated circuit board 40 and the battery 70 provide the function of electronic candle lamp, the simulated flame sheet 31 can produce the effect of a simulated swaying flame, the exterior of the integrated circuit board 40 is provided with a waterproof hood 50, and the battery 70 is arranged in the waterproof battery compartment 60, so as to prevent rainwater from entering into the accommodating space 13 or damaging the integrated circuit board 40, the battery 70 and other electronic components.

In addition, when the waterproof electronic candle lamp of the present disclosure is installed outdoors, the positioning cover 20 is surrounded by at least a drainage hole 23 in order to avoid the accumulation of rainwater from entering the positioning cover 20 from the ring frame 21, and discharge the rainwater that falls into the ring frame 21, so that the rainwater will not accumulate in the positioning cover 20, and the requirement for using the electronic candle lamp outdoors is met.

Figure 7:
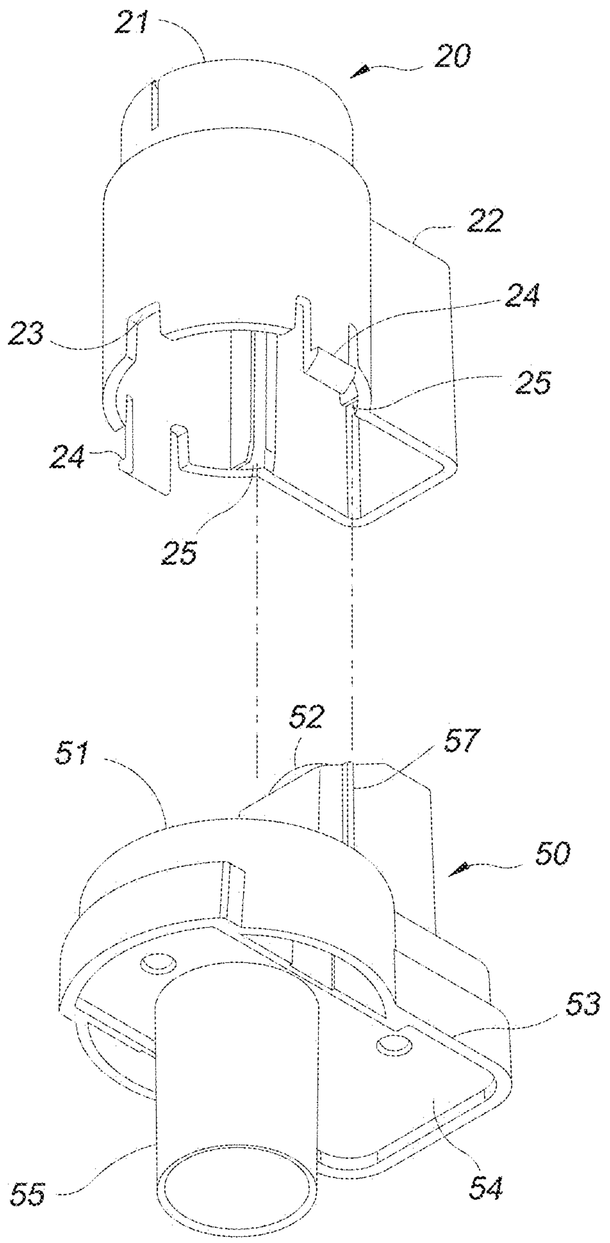
FIG. 7 is an exploded view of a positioning cover and a waterproof hood of the present disclosure, viewing from another angle.
Figure 8:
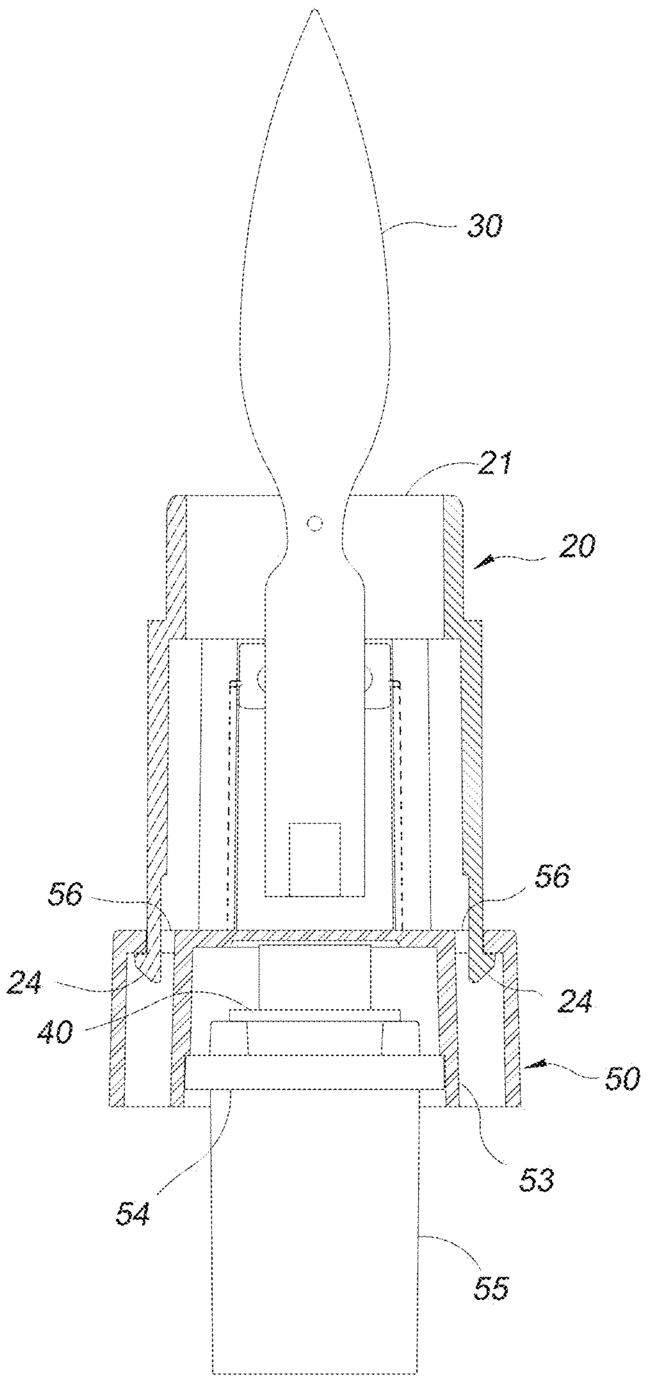
FIG. 8 is a schematic view of the assembled structure of FIG. 3, viewing from another angle.

Other embodiments of the present disclosure are described below:

As shown in FIGS. 7 and 8, the ring frame 21 of the positioning cover 20 extends downwards with a plurality of buckle hooks 24, the outer wall plate 53 of the waterproof hood 50 extends outward with a plurality of snap slots 56, and the plurality of buckle hooks 24 of the positioning cover 20 can be snapped to the plurality of snap slots 56 of the waterproof hood 50, so that the combination relationship between the positioning cover 20 and the waterproof hood 50 will not destroy the covering and waterproof structure of the waterproof hood 50 for the integrated circuit board 40.

In addition, the corresponding surface between the side casing 22 of the positioning cover 20 and the translucent part 52 of the waterproof hood 50 is respectively provided with a group of slide slots 25 and a convex rail 57 that can be embedded in the slide slots 25, so that when the positioning cover 20 is combined with the waterproof hood 50, the slide slot 25 and the convex rail 57 are embedded and positioned relative to each other, and then the positioning cover 20 and the waterproof hood 50 are combined and fixed with each other through the plurality of buckle hooks 24 and the plurality of snap slots 56.

Furthermore, as shown in FIG. 6, a waterproof sleeve 80 can be further sleeved between the first pipe 55 and the second pipe 63 for passing the plurality of power lines 71. The waterproof sleeve 80 can be matched with the hollow column 10 of different heights by adjust the length, so that there no gap will be produced between the first pipe 55 and the second pipe 63 to prevent rainwater from entering.

As shown in FIGS. 2 and 5, the assembly of the waterproof battery compartment 60 is to form a mounting opening 15 around the bottom end 12 of the hollow column 10, the base 61 of the waterproof battery compartment 60 is detachably mounted onto the mounting opening 15, and the central recess of the base 61 is provided with an accommodation slot 64 for installing the battery 70, and the waterproof cover 62 can be tightly sealed from top to bottom with the accommodation slot 64 in a clamping or screwing manner to prevent water moisture from penetrating into the waterproof battery compartment 60 or damaging the battery 70 and other components.

In addition, the outer periphery of the base 61 is provided with a plurality of drainage holes 65 relative to the waterproof cover 62 and the accommodation slot 64, so that the rainwater that falls into the accommodating space 13 can be discharged to the outside to prevent the rainwater from accumulating in the hollow column 10.

While the present disclosure is described by the above embodiments, it is noteworthy that these are only examples of the preferred embodiments of the present disclosure and are not intended to limit the scope of the disclosure invention, and any purpose, structure, device, feature, etc. similar to or identical with those of the present disclosure shall fall within the scope of the present disclosure.

What is claimed is:

1. A waterproof electronic candle lamp, comprising:

a hollow column, with a top surface, a bottom end, and an accommodation space formed between the top surface and the bottom end, wherein a through hole is formed on the top surface to communicate the accommodation space;

a positioning cover, installed below the top surface, integrally comprising a ring frame around the inner periphery of the through hole, and a side casing positioned at a side edge of the ring frame, wherein the ring frame is swingably provided with a swinging member, the swinging member comprises a simulated flame sheet protruding from the top surface of the hollow column, and a magnetic element positioned below the simulated flame sheet;

an integrated circuit board (PCBA), comprising a substrate installed below the positioning cover and provided with an electromagnetic element at a position below the magnetic element relative to the magnetic element, and an LED projecting light towards the simulated flame sheet being protruded upwards relative to the side casing position, and the electromagnetic element generating a magnetic force in a non-contact manner to drive the magnetic element of the swinging member to swing and move, such that the simulated flame sheet produces a bright light of a simulated swaying flame;

a waterproof hood, installed below the positioning cover, comprising a cover plate installed above the integrated circuit board from top to bottom, a spacing defined between the cover plate and the swinging member to provide a swinging space for the swinging member, wherein the hood is integrally protruded, provided with a translucent part and positioned at the periphery of the LED, so that the light of the LED can pass through the translucent part, and the outer periphery of the cover plate extends downwards to form an outer wall plate that surrounds the periphery of the integrated circuit board, and a bottom plate is installed below the outer wall plate to shade the bottom of the integrated circuit board, the integrated circuit board is sealed between the cover plate and the bottom plate, and the bottom plate extends downward with a first pipe; and a waterproof battery compartment, formed in the accommodating space between the waterproof hood and the bottom end of the hollow column, comprising a battery, a cover installed above the waterproof cover of the battery, a second pipe extending upwards and directly or indirectly coupled with the first pipe, and the first and second pipes being provided with a plurality of power lines electrically coupled between the battery and the integrated circuit board.

2. The waterproof electronic candle lamp according to claim 1, wherein the periphery of the positioning cover is provided with at least one drainage hole for discharging rainwater falling into the ring frame.

3. The waterproof electronic candle lamp according to claim 1, wherein the ring frame of the positioning cover extends downwards with a plurality of buckle hooks, and the outer wall plate of the waterproof hood extends outward with a plurality of snap slots, and the plurality of buckle hooks of the positioning cover can be fastened and fixed to the plurality of snap slots of the waterproof hood.

4. The waterproof electronic candle lamp according to claim 3, further comprising a plurality of slide slots and a convex rail embeddable into the slide slots respectively arranged on the corresponding surfaces between the side casing of the positioning cover and the translucent part of the waterproof hood.

5. The waterproof electronic candle lamp according to claim 1, further comprising a waterproof sleeve sleeved between the first and the second pipes for passing and installing the plurality of power lines.

6. The waterproof electronic candle lamp according to claim 1, wherein the bottom end of the hollow column is enclosed to form a mounting opening, and the waterproof battery compartment further comprises a base detachably arranged in the mounting opening, and the central recess of the base is provided with an accommodation slot for installing the battery, and the waterproof cover is clamped or screwed around the accommodation slot from top to bottom.

7. The waterproof electronic candle lamp according to claim 6, wherein the base is provided with a plurality of drainage holes relative to the periphery of the waterproof cover and the containment groove for discharging the rainwater falling into the accommodation space.

8. The waterproof electronic candle lamp according to claim 1, wherein the swinging part further comprises a steel wire spanning across the ring frame of the positioning cover, and the simulated flame sheet is provided with a through hole relative to the top of the magnetic element for passing the steel wire, so that the simulated flame sheet can be swung with respect to the positioning cover with the through hole and the steel wire as a fulcrum.

* * * * *